(12) United States Patent
Wilhelm et al.

(10) Patent No.: US 10,309,302 B2
(45) Date of Patent: Jun. 4, 2019

(54) NOISE SUPPRESSION SYSTEM

(71) Applicant: Kohler Co., Kohler, WI (US)

(72) Inventors: Timothy Wilhelm, New Holstein, WI (US); Justin D. Keske, Elkhart Lake, WI (US); Adam L. Clouse, Howards Grove, WI (US)

(73) Assignee: Kohler Co.

( * ) Notice: Subject to any disclaimer, the term of this patent is extended or adjusted under 35 U.S.C. 154(b) by 0 days.

(21) Appl. No.: 15/443,153

(22) Filed: Feb. 27, 2017

(65) Prior Publication Data

US 2017/0260901 A1    Sep. 14, 2017

Related U.S. Application Data

(60) Provisional application No. 62/305,964, filed on Mar. 9, 2016.

(51) Int. Cl.
*F01P 1/06*        (2006.01)
*H02K 7/18*        (2006.01)
(Continued)

(52) U.S. Cl.
CPC .............. *F02B 77/13* (2013.01); *F01P 1/06* (2013.01); *F02B 63/04* (2013.01); *F02B 63/044* (2013.01); *H02K 7/1815* (2013.01)

(58) Field of Classification Search
CPC ....... F02B 77/13; F02B 63/04; H02K 7/1815; F01P 1/06
See application file for complete search history.

(56) References Cited

U.S. PATENT DOCUMENTS 2,759,556 A    8/1956   Baruch
3,726,359 A *  4/1973   Dierl ...................... A22C 17/10
                                                     181/224
(Continued)

FOREIGN PATENT DOCUMENTS

CN          2769749      4/2006
CN        201241754      5/2009
(Continued)

OTHER PUBLICATIONS

Corresponding European Search Report for EP17159362 dated Jul. 17, 2017.

*Primary Examiner* — Jacob M Amick
*Assistant Examiner* — Charles Brauch
(74) *Attorney, Agent, or Firm* — The Belles Group, P.C.

(57) ABSTRACT

A noise suppression system for an electric generator having a housing including an internal combustion engine and air-cooled alternator. A fan draws ambient cooling air into the housing for cooling the alternator. The system may include an acoustically designed noise suppression shroud forming a cavity which contains a plurality of parallel flow baffles. The baffles define air flow passages there-between which receive cooling air heated by the alternator. In one system, the baffles are configured and arranged to block a straight line of sight between the entrance and exit of each passage. The baffles may each further include sound deadening materials on one or both sides in some configurations. Heated cooling air flows into the shroud and through the passages before being discharged from the housing. The shroud is operable to suppress noise produced by the cooling air discharge flow. Various shroud configurations may include additional sound proofing features.

14 Claims, 12 Drawing Sheets

(51) Int. Cl.
*F02B 63/04* (2006.01)
*F02B 77/13* (2006.01)

(56) References Cited

U.S. PATENT DOCUMENTS

| | | | |
|---|---|---|---|
| 4,495,901 A | 1/1985 | Nannini et al. | |
| 4,660,676 A | 4/1987 | Eustace | |
| 5,332,872 A | 7/1994 | Ewanek | |
| 5,433,175 A | 7/1995 | Hughes et al. | |
| 5,452,362 A | 9/1995 | Burward-Hoy | |
| 5,492,143 A * | 2/1996 | Cooper | B01D 29/117 |
| | | | 137/15.01 |
| 5,625,172 A | 4/1997 | Blichmann et al. | |
| 5,670,757 A * | 9/1997 | Harris | F01N 1/083 |
| | | | 181/264 |
| 5,715,904 A * | 2/1998 | Takahashi | B60K 11/08 |
| | | | 180/229 |
| 5,977,667 A | 11/1999 | Hirose | |
| 6,039,009 A | 3/2000 | Hirose | |
| 6,186,890 B1 | 2/2001 | French et al. | |
| 6,376,951 B1 | 4/2002 | Moore | |
| 6,643,130 B1 | 11/2003 | DeMarchis et al. | |
| 7,314,397 B2 | 1/2008 | Sodemann et al. | |
| 7,334,662 B1 | 2/2008 | Anderl et al. | |
| 7,379,299 B2 | 5/2008 | Walsh et al. | |
| 7,778,013 B2 | 8/2010 | Bruski et al. | |
| 7,902,705 B2 | 3/2011 | Gravlin et al. | |
| 8,087,492 B2 | 1/2012 | Cursetjee et al. | |
| 8,672,089 B2 | 3/2014 | Kelly et al. | |
| 8,701,821 B2 | 4/2014 | O'Coimin et al. | |
| 8,872,361 B2 | 10/2014 | Janscha et al. | |
| 8,881,694 B2 | 11/2014 | Gillett et al. | |
| 8,911,033 B2 | 12/2014 | Li et al. | |
| 9,125,302 B2 | 9/2015 | Elkins | |
| 2003/0042237 A1 * | 3/2003 | Brofft | F02B 63/04 |
| | | | 219/133 |
| 2006/0148398 A1 | 7/2006 | Ruch et al. | |
| 2007/0218826 A1 | 9/2007 | Walsh et al. | |
| 2008/0230305 A1 | 9/2008 | Goto et al. | |
| 2008/0311840 A1 | 12/2008 | Rainey et al. | |
| 2010/0037837 A1 | 2/2010 | Yamasaki et al. | |
| 2010/0051563 A1 | 3/2010 | Schreiber | |
| 2011/0168482 A1 | 7/2011 | Merchant et al. | |
| 2012/0097479 A1 * | 4/2012 | Kelly | F02B 77/13 |
| | | | 181/264 |
| 2014/0069735 A1 | 3/2014 | Li et al. | |
| 2015/0008679 A1 | 1/2015 | Janscha et al. | |
| 2015/0181735 A1 | 6/2015 | Wilson et al. | |

FOREIGN PATENT DOCUMENTS

| | | |
|---|---|---|
| CN | 201852256 | 6/2011 |
| CN | 104456905 | 3/2015 |
| EP | 2148012 | 1/2010 |
| GB | 1197900 | 7/1970 |
| GB | 2028471 | 3/1980 |
| GB | 2272486 | 5/1994 |
| GB | 2293234 | 3/1996 |
| JP | H1030454 | 2/1998 |
| JP | 2000097040 | 4/2000 |
| WO | 7900011 | 1/1979 |
| WO | 200174025 | 10/2001 |
| WO | 2007045030 | 4/2007 |
| WO | 2010060482 | 6/2010 |
| WO | 2015071915 | 5/2015 |
| WO | 2015136357 | 9/2015 |

* cited by examiner

NOISE SUPPRESSION SYSTEM

CROSS-REFERENCE TO RELATED APPLICATIONS

The present application claims the benefit of priority to U.S. Provisional Application No. 62/305,964 filed Mar. 9, 2016; the entirety of which is in herein by reference.

BACKGROUND OF THE INVENTION

The present invention generally relates to sound or noise suppression, and more particularly to a noise suppression system for suppressing noise associated with air cooled alternators used with internal combustion engine generators.

Internal combustion engines typically fueled by diesel or gasoline may be used for generating electric power for various applications. One example is a marine generator used onboard a ship or boat. Marine generators often have a liquid-cooled engine, but many also have an air-cooled alternator rotated by the engine which generates the electric current. The exhaust air discharged by an air-cooled alternator may be a source of noise.

A noise suppression system is desired for quieting the noise produced by an air-cooled alternator in a generator assembly.

SUMMARY OF THE INVENTION

A noise suppression system for a generator assembly is disclosed that suppresses noise produced by operation of an air-cooled alternator mechanically coupled to an internal combustion engine to produce electric power. In one aspect, the system includes an acoustically designed noise suppression shroud. The shroud defines an air discharge outflow path for receiving, conveying, and discharging heated cooling air used to cool the alternator inside the generator housing. The shroud operates to quiet noise associated with the cooling air discharge flow. In one configuration, the shroud may be mounted on an openable access door or panel included with the generator housing for gaining access to the generator and related appurtenances.

In one non-limiting implementation, the shroud may include a plurality of parallel flow baffles which define air discharge passages configured and arranged to reduce the noise produced by the flowing heated cooling air being discharged from the generator housing.

In one aspect, a generator system having noise suppression includes: a generator housing; an electric generator disposed inside the generator housing, the generator including an internal combustion engine and an alternator coupled to the engine; an array of flow baffles defining a plurality of parallel air flow passages, each of the air flow passages including an entrance for receiving heated air from the alternator and an exit for discharging the heated air; wherein the flow baffles are configured so that there is no straight line of sight between the entrance and the exit of each of the air flow passages.

In another aspect, a generator system having noise suppression includes: an outer generator housing defining an internal chamber; an electric generator disposed in the internal chamber of the outer generator housing, the generator including an internal combustion engine and an alternator disposed in an inner alternator enclosure located inside the internal chamber, the alternator mechanically coupled to the engine to generate electric current; a noise suppression shroud interposed between the generator housing and the alternator enclosure, the shroud including an air inlet fluidly sealed to an air discharge opening of the alternator enclosure and receiving heated air from the alternator enclosure; a plurality of flow baffles disposed inside the noise suppression shroud, the flow baffles defining a plurality of air flow passages, each of the air flow passages including an entrance which receives the heated air from the alternator enclosure and an exit which discharges the heated air.

In another aspect, a generator system having noise suppression includes: a generator housing having an access opening; an electric generator disposed inside the generator housing, the generator including an internal combustion engine and an alternator coupled to the engine which produces electric current; an access assembly operably attached to the generator housing so as to enclose the access opening, the access assembly comprising: an air inlet configured to receive heated air from the alternator; an air outlet configured to discharge the heated air; a plurality of flow baffles disposed within an internal cavity of the access assembly, the baffles defining air flow passages between the air inlet and the air outlet.

In another aspect, an access panel with noise suppression features for mounting to an electric generator housing includes: a substantially planar panel body configured for operable attachment to the generator housing containing an electric generator; the panel body comprising a front surface and an opposite rear surface which faces inward towards the generator housing when attached thereto; a shroud attached to the panel body, the shroud having a substantially rectilinear configuration comprising a rear wall, a top wall, a bottom wall, and opposing lateral sidewalls collectively defining an internal cavity; a cooling air inlet disposed at a first end of the shroud and a cooling air outlet disposed at an opposite second end of the shroud; a plurality of parallel flow baffles disposed in the internal cavity of the shroud, the baffles extending horizontally between the air inlet and outlet, and defining air flow passages between the baffles, the air flow passages each including an entrance proximate to the air inlet and an exit proximate to the air outlet; each of the baffles having top and bottom surfaces at least one of which comprises a sound deadening material; wherein the baffles each include a straight entrance portion and an adjoining angled exit portion which is obliquely angled to the straight entrance portion.

BRIEF DESCRIPTION OF THE DRAWINGS

The features of the preferred embodiments will be described with reference to the following drawings where like elements are labeled similarly, and in which.

Figure 1:
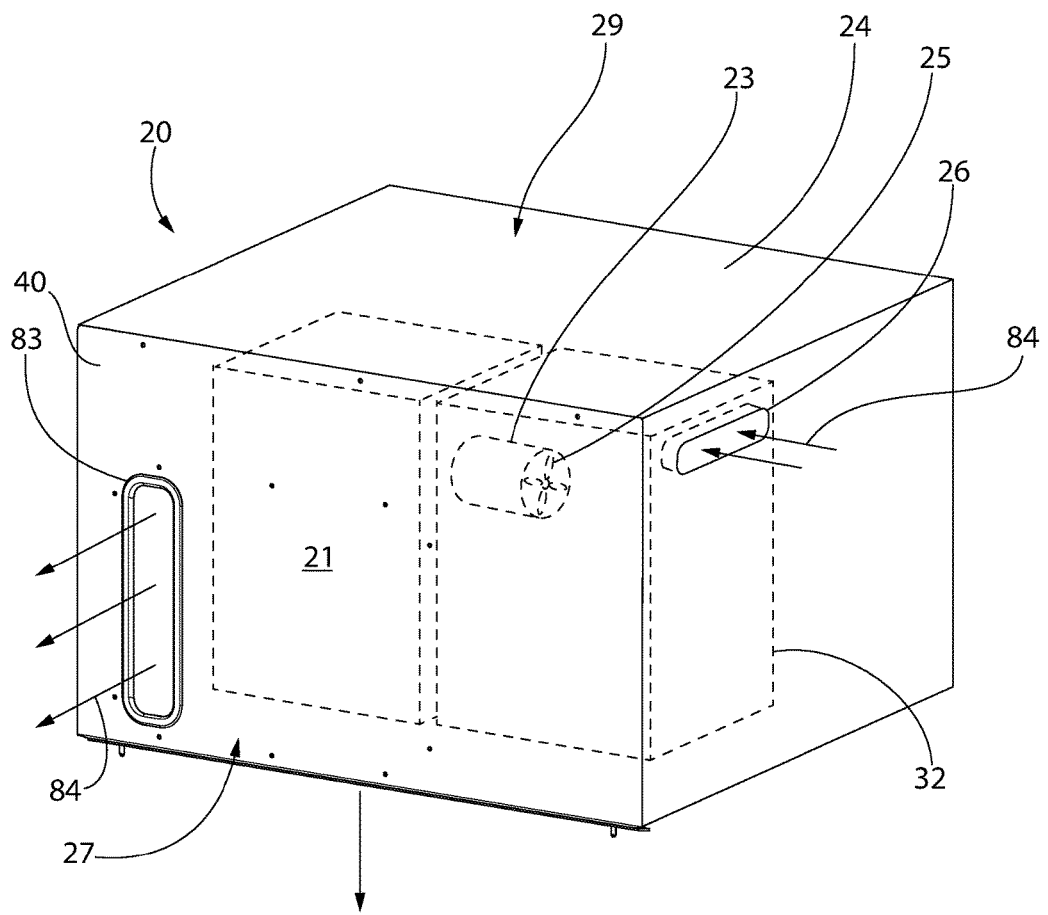
FIG. 1 is a front top perspective view of a generator incorporating a noise suppression system according to the present disclosure.

All drawings are schematic and not necessarily to scale.

DETAILED DESCRIPTION OF EMBODIMENTS

The features and benefits of the present disclosure are illustrated and described herein by reference to non-limiting examples. This description of examples is intended to be read in connection with the accompanying drawings, which are to be considered part of the entire written description. Accordingly, the present disclosure expressly should not be limited to such examples illustrating some possible non-limiting combination of features that may exist alone or in other combinations of features; the scope of the claimed invention being defined by the claims appended hereto.

In the description of examples disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constricted or operated in a particular orientation. Terms such as "attached," "coupled," "affixed," "connected," "interconnected," and the like refer to a relationship wherein structures are secured or attached to one another either directly or indirectly through intervening structures, as well as both movable or rigid attachments or relationships, unless expressly described otherwise. The terms "sound" and "noise" may be used interchangeably herein unless specifically noted to the contrary.

Figure 2:
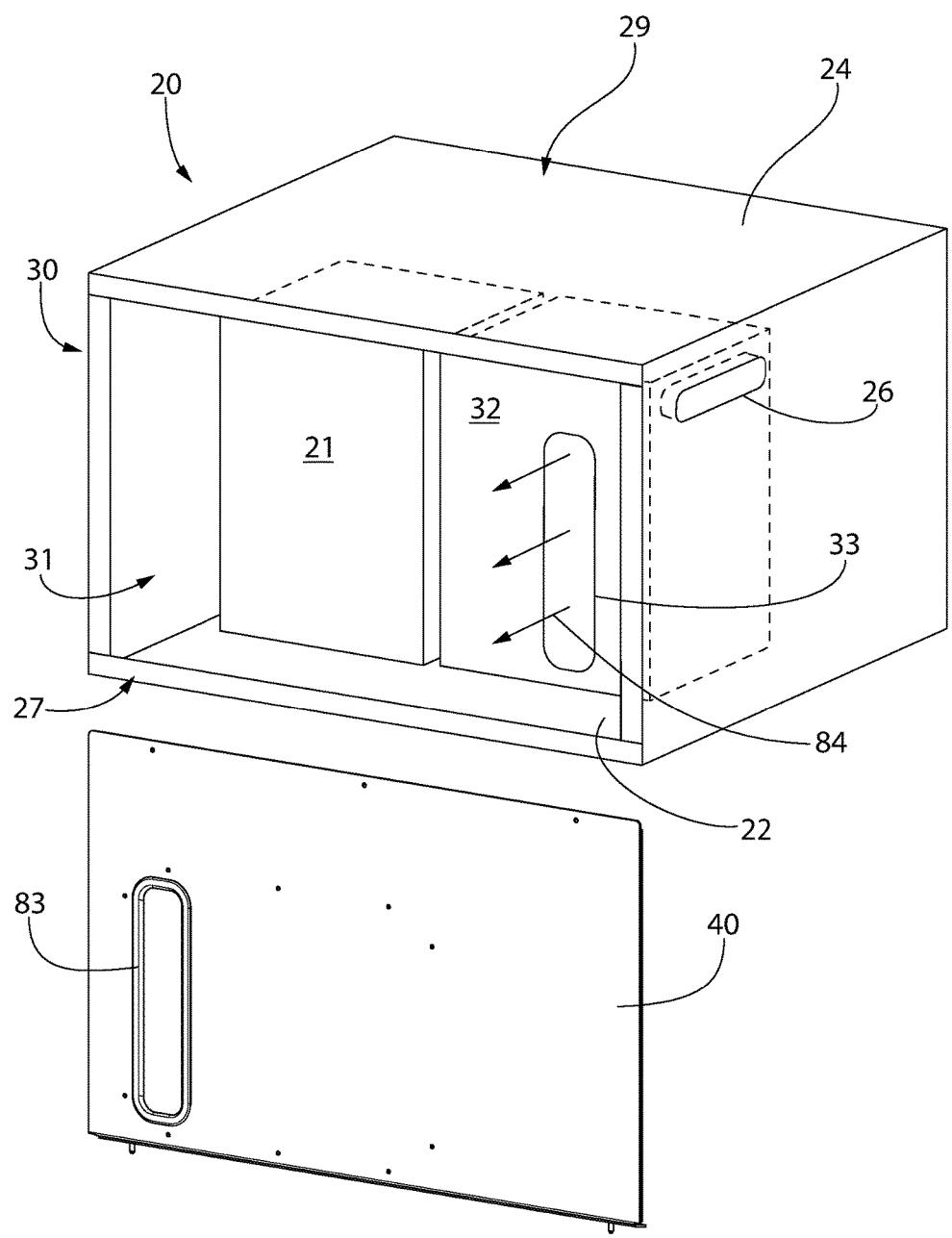
FIG. 2 is a front top perspective view of the generator showing an access panel removed from the generator housing which reveals an internal combustion engine and air-cooled alternator inside.
Figure 3:
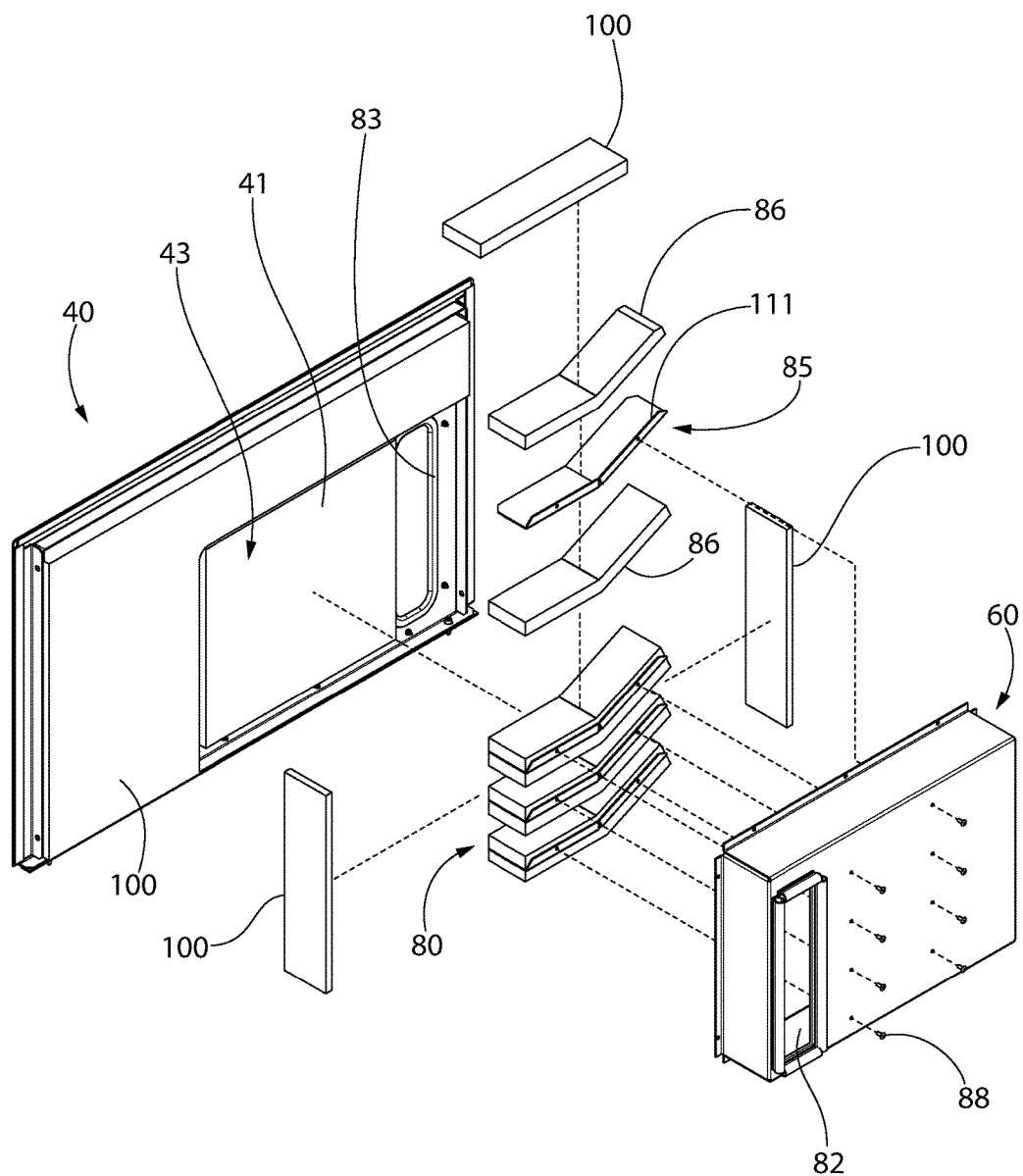
FIG. 3 is an exploded perspective view of the access panel showing a noise suppression shroud.
Figure 4:
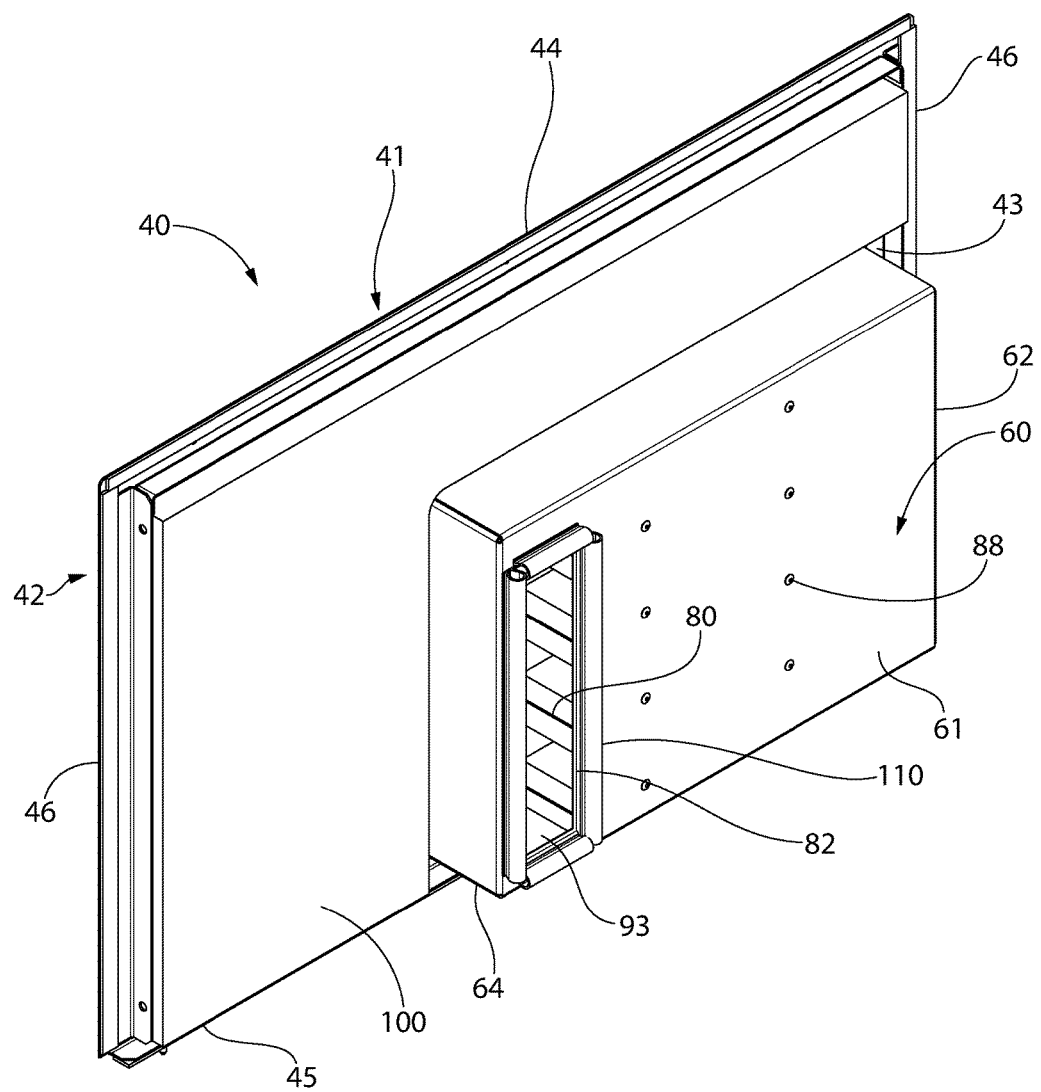
FIG. 4 is a rear perspective view showing the rear of the access panel with shroud attached which would face inwards into the generator housing when assembled as in FIG. 1.
Figure 5:
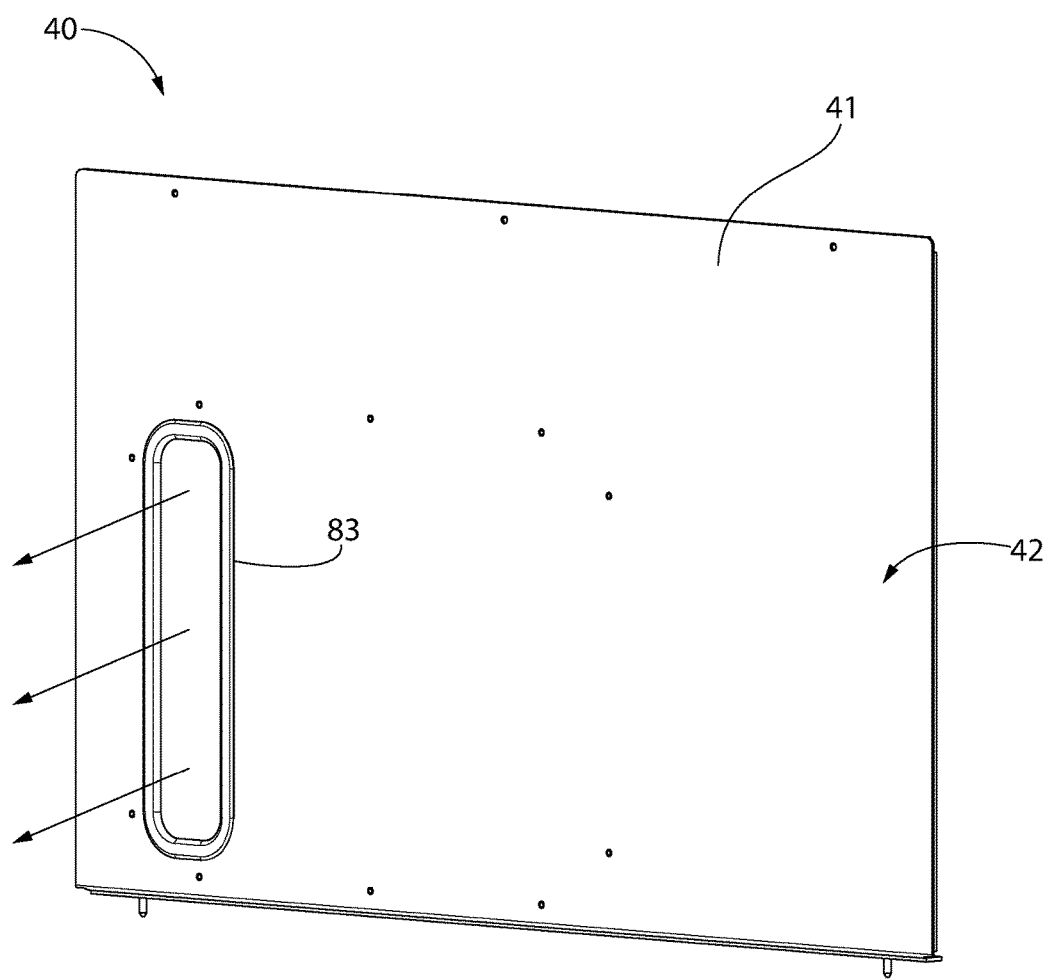
FIG. 5 is a front perspective view of the access panel.
Figure 6:
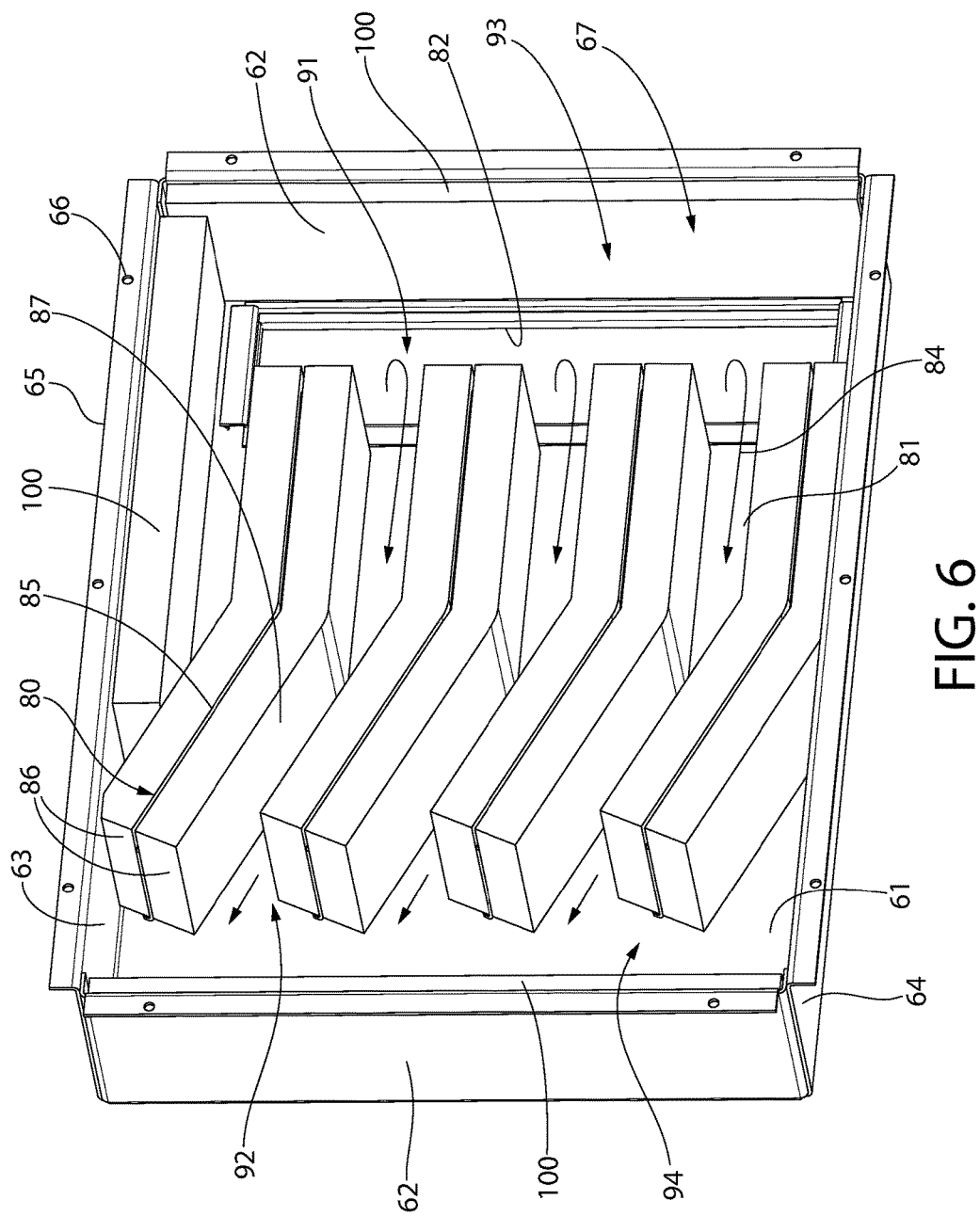
FIG. 6 is a front perspective view of the shroud showing the inside with multiple flow baffles.
Figure 7:
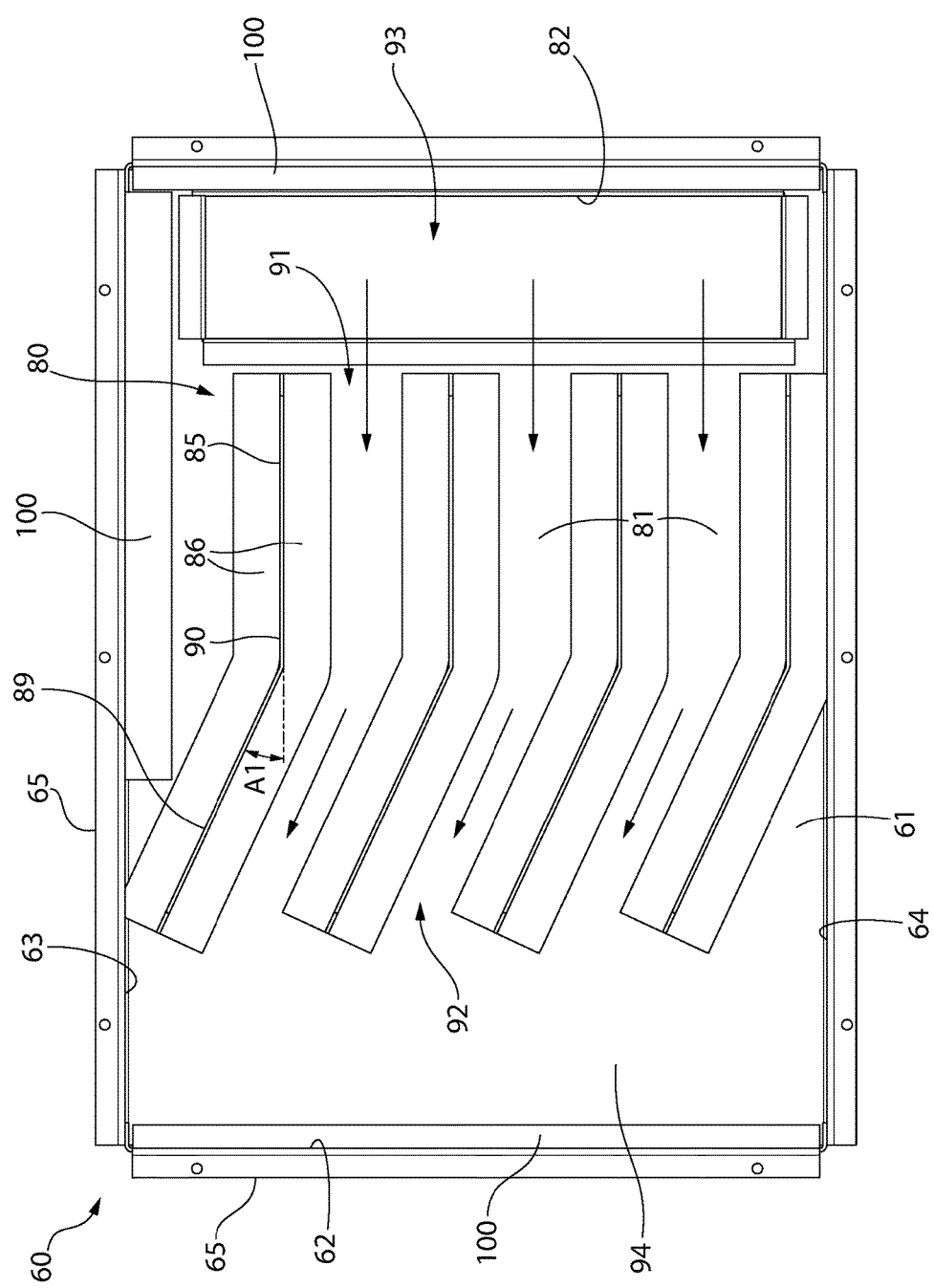
FIG. 7 is a front elevation plan view of the shroud.
Figure 8:
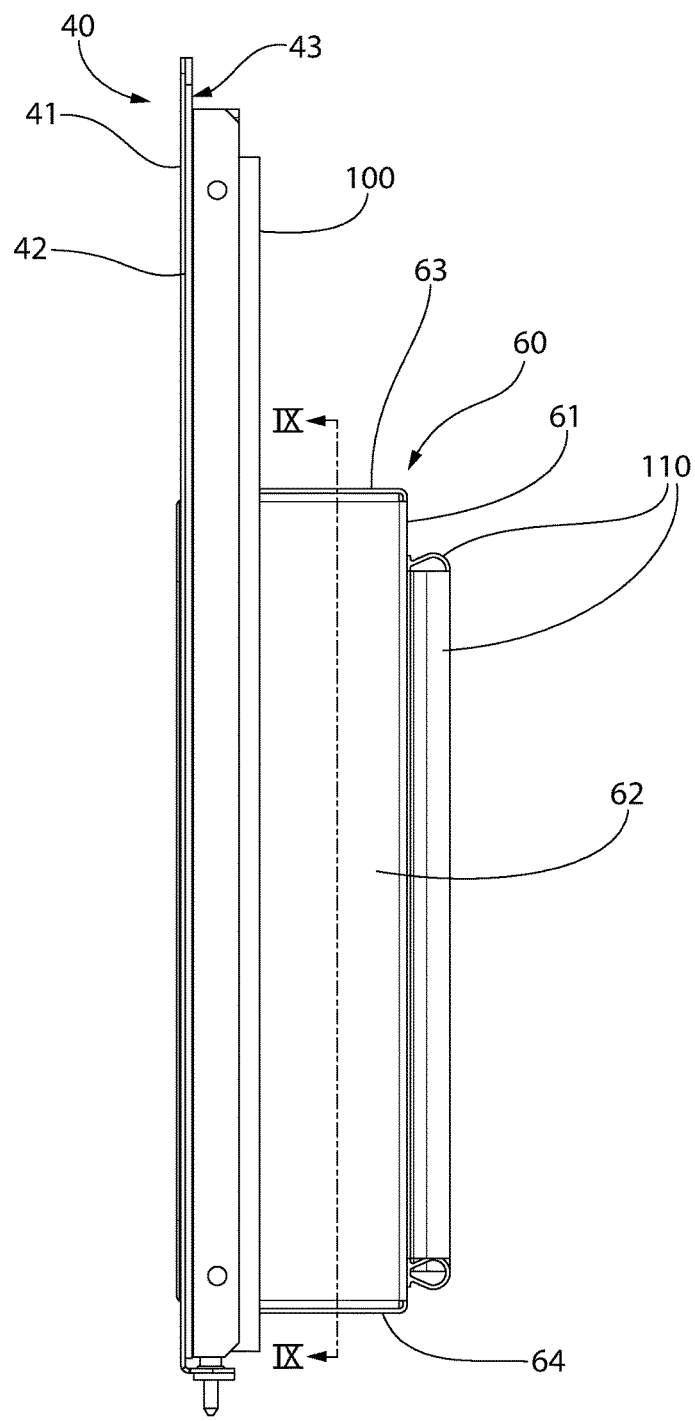
FIG. 8 is a side elevation view of the access panel.
Figure 9:
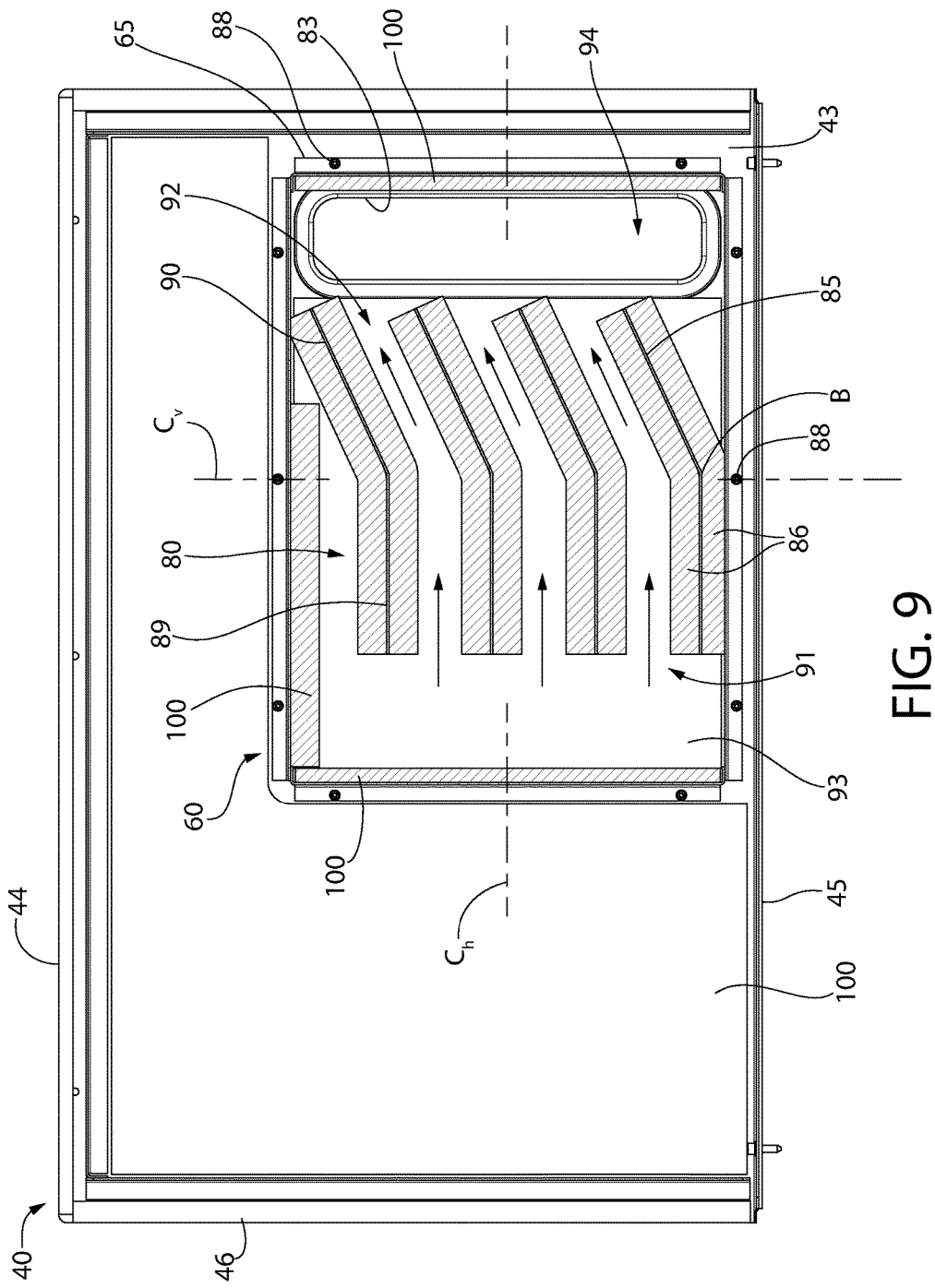
FIG. 9 is a cross sectional view taken along line IX-IX in FIG. 8.
Figure 10:
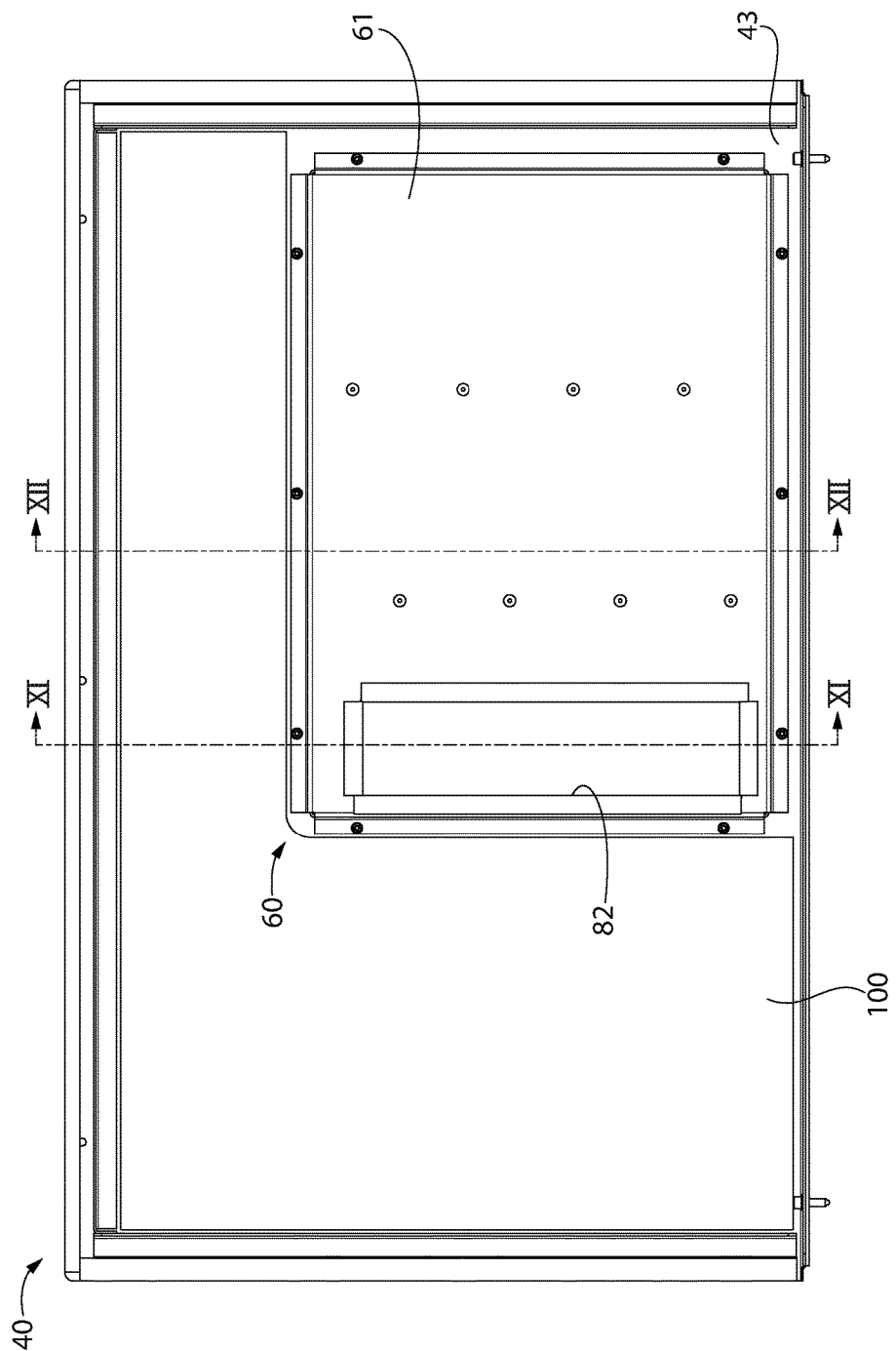
FIG. 10 is a rear elevation plan view of the access panel.
Figure 11:
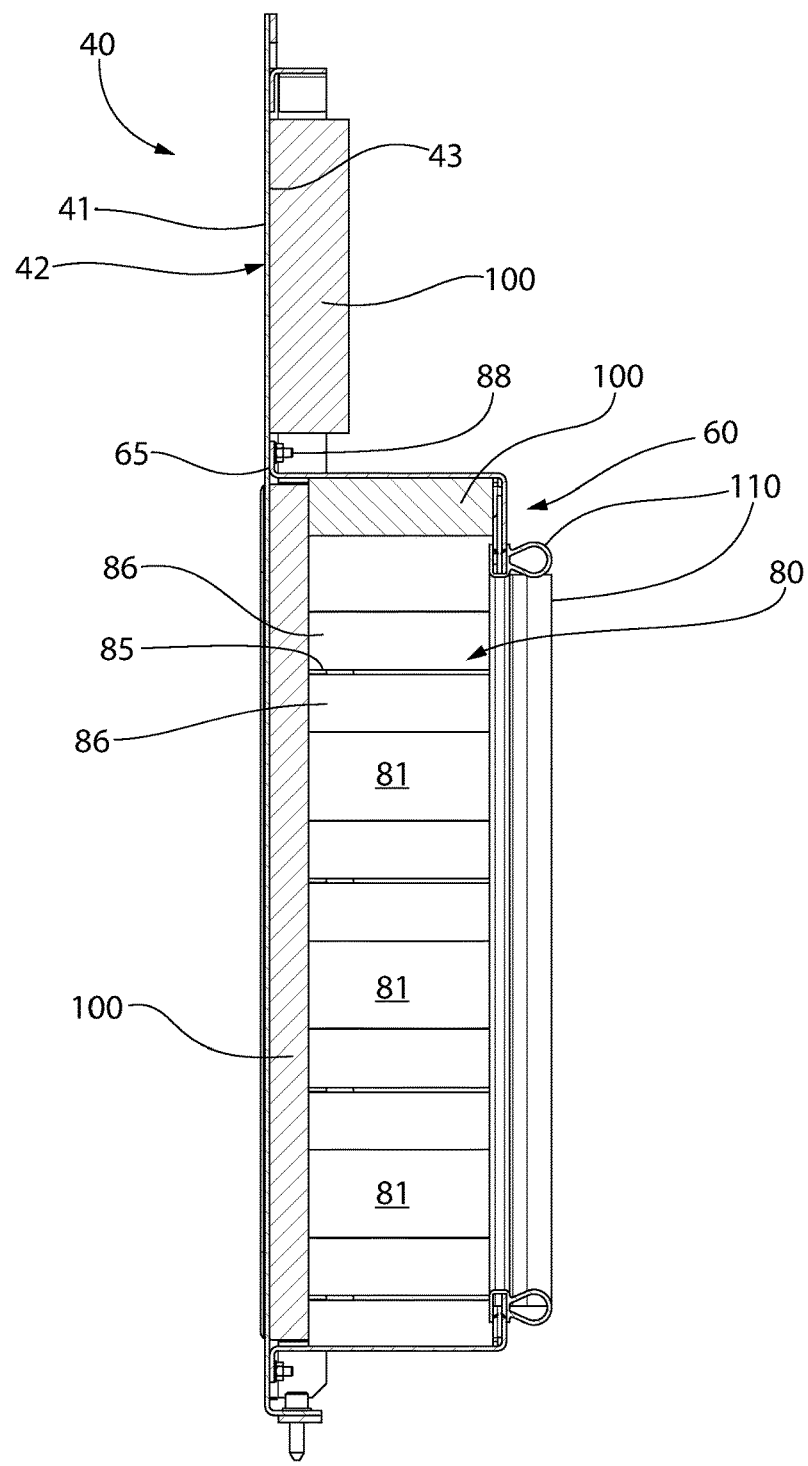
FIG. 11 is a cross sectional view taken along line XI-XI in FIG. 10.
Figure 12:
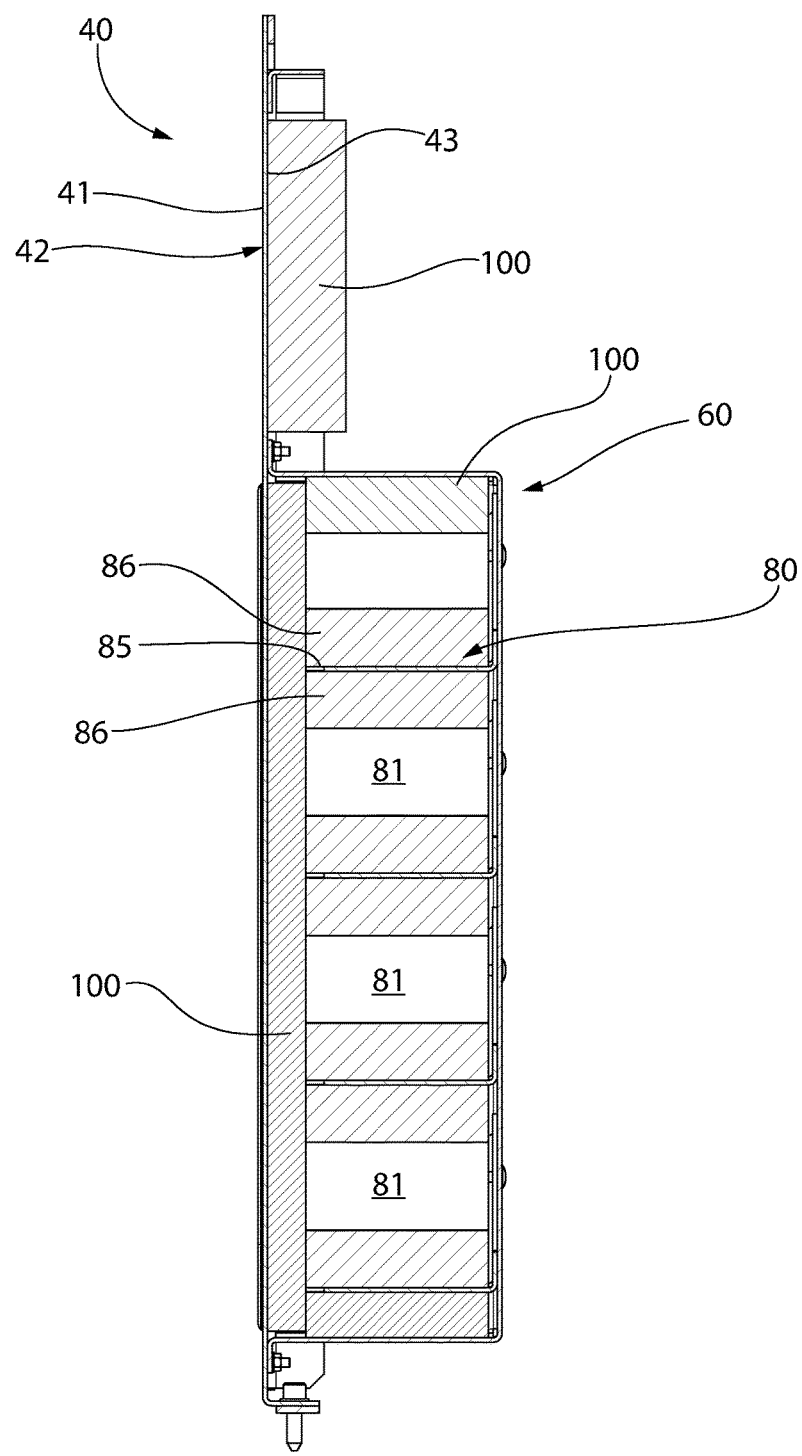
FIG. 12 is a cross sectional view taken along line XII-XII in FIG.

FIGS. 1 and 2 show a non-limiting implementation of a generator which may include a noise suppression system according to the present disclosure. Generator 20 includes an internal combustion engine 21 mounted on and supported by a base 22, an alternator 23 rotatably coupled to the engine, and a generator housing 24. Rotation of the engine drive shaft turns the alternator's rotor (revolving field type) or armature windings (revolving armature type) to produce electric current. The housing 24 defines an internal chamber 31 which encloses and protects the engine, alternator, and related appurtenances used to form a fully functional generator system for producing electric power. In one non-limiting example, the engine 21 may be water-cooled and the alternator 23 may be air cooled using ambient air outside the housing for cooling. The engine 21 may be a marine generator in some implementations including a diesel or gasoline fueled internal combustion engine. In this implementation, the alternator 23 may therefore be a marine alternator.

Housing 24 may be rectilinear in configuration and includes a front 27, rear 28, a top 29 opposite base 22 which forms the bottom of the housing, and opposing lateral sides 30 on either end. The alternator 23 may be supported by the generator, base 22, housing 24, or a combination thereof. Housing 24 may be made of any suitable material, including without limitation metallic materials, non-metallic materials, or a combination thereof. In some non-limiting implementations, the housing may be made of metal such as aluminum or steel for durability.

Mechanically powered cooling fan 25 which in one implementation may be mounted directly on the alternator 23 at one end operates to draw ambient cooling air into the housing 24 from outside via an air intake opening 26 and pass the air across the alternator which becomes heated. The air intake opening 26 may have any appropriate configuration and penetrates the housing 24 at any suitable location such as for example on the sides, front, back, or top. The alternator 23 may be disposed in a separate enclosure 32 within the generator housing 24 that includes an air discharge opening 33 of any suitable configuration for discharging the cooling air heated by the alternator from the alternator enclosure 32. The same design can be used for engine compartments and outlet ducts.

Housing 24 further includes an openable access assembly attached to the generator housing so as to enclose an access opening defined by the front 27 of the housing. The access assembly may comprise an openable access door or panel 40 mounted on the front 27 of housing 24 for providing access to the internal chamber 31 and a noise suppression shroud 60 incorporated with the access panel. In various implementations, the front access panel 40 may be latchably, removably, hingedly, or slidably attached to the housing by any suitable fastening mechanism. In the non-limiting illustrated example, panel 40 may be completely removable providing maximum access to the interior of the generator housing. Such a panel may be attached to the housing 24 via threaded fasteners as an example; however, other types fasteners may be used in addition to or alternatively including latches, locks, pins, tape, inserts or various combinations of coupling and fastening elements. Accordingly, the means used to attach the access panel 40 to the generator housing 24 is not limiting.

Access panel 40 has a substantially flat body and rectilinear configuration to complement the configuration of the generator housing 24. Panel 40 includes a vertical front wall 41 having a front surface 42 and opposing rear surface 43, peripheral top edge 44, opposing peripheral bottom edge 45, and pair of opposing peripheral side edges 46. The panel 40 may be made of a material the same as or different than the generator housing 24 described herein. In one implementation, the panel may be made of plastic or metal such as aluminum or steel.

With additional reference to FIGS. 3-11, the noise suppression shroud 60 may be provided to reduce the noise associated with discharging heated alternator cooling air from the generator housing 24 into the ambient environment. The shroud 60 includes noise suppression features and may be configured to form an air discharge flow path which operates to receive and discharge the heated alternator cooling air in a quiet but non-restrictive manner.

Noise suppression shroud 60 may have a rectilinear or rounded box-like configuration including a rear wall 61, top wall 63, opposing bottom wall 64 and opposing lateral sidewalls 62. The walls define an internal cavity 67 for mounting noise suppression features. The shroud 60 may be made of a material the same as or different than the generator housing 24 or access panel 40. In one implementation, the panel may be made of plastic or metal such as aluminum or steel.

The noise suppression shroud 60 may includes outwardly extending mounting flanges 65 arranged around the perimeter of the shroud. The shroud may be located inside the generator housing 24 as shown for visual aesthetics and notably to reduce the footprint of the generator housing for conserving space which is desirable particularly for marine generator installations onboard a vessel. In one non-limiting implementation, the shroud may be mounted on the inside rear surface 43 of the front access panel 40. This arrangement results in the shroud 60 protruding inwards from the access panel into the internal chamber 31 of the generator housing. The mounting flanges 65 may be attached to the access panel 40 by any suitable detachable or permanent means, including for example without limitation threaded fasteners 88 such as screws or alternatively studs spot welded or capacitive discharge studs onto the rear surface 43 of the access panel 40 onto which nuts are applied. The studs would be invisible from outside the access panel. Fasteners 88 are inserted through fastener holes 66 in the mounting flange. Other methods of attaching the shroud 60 to the access panel 40 include without limitation riveting, welding, soldering, adhesives, or other methods or combination of methods.

In one non-limiting implementation, the noise suppression features of the shroud 60 may include a plurality of vertically spaced, parallel flow baffles 80 mounted inside cavity 67. The baffles may be generally horizontally oriented and elongated in length. Baffles 80 define air flow passages 81 between the baffles of complementary configuration and orientation for conveying the heated cooling air discharged by the alternator 23. The passages 81 are in fluid communication with the cooling air heated by the alternator 23 and discharged by the alternator's fan 25 (see, e.g. flow arrows 84) via a heated cooling air inlet 82, and the ambient environment surrounding the exterior of the generator housing 24 via a heated cooling air outlet 83 in the access panel 40. The heated cooled air is discharged through the outlet 83 from the generator housing 24 after passing through the array of baffles 80.

The air flow passages 81 may each have an entrance 91 located at the air inlet 82 and an exit 92 located at the air outlet 83. An inlet air plenum 93 is formed inside the shroud 66 at the air inlet 82. An outlet air plenum 94 is formed inside the shroud at the air outlet 83 in the access panel 40. In one arrangement, the baffles 80 may therefore each have an entrance terminal end which terminates at the air inlet 82 but does not protrude into the inlet and an opposing exit terminal end which terminates at the air outlet 83 but does not protrude into the outlet. In other possible arrangements, the terminal ends may protrude into the air inlet 82 and/or the air outlet 83.

The baffles 80 may be constructed, configured, and arranged to sonically suppress noise produced by the flowing alternator heated cooling air discharge flow. The baffles are elongated each having a length greater than a width (front to rear) and may extend horizontally from the air inlet 82 to the air outlet 83. In one non-limiting implementation, each of the baffles 80 may be formed from a flat metal plate 85 sandwiched between opposing layers of a sound deadening insulation or material 86 affixed to the top and bottom surfaces of each baffle. In other implementations, the baffle plates 85 may be formed of a non-metallic material (e.g. plastic, fiberglass, graphite, composites, etc.). The sound deadening materials 86 may be in semi-rigid of rigid block or sheet form of suitable thickness. In one non-limiting example, acoustic foam insulation may be used or another suitable sound deadening material. In one example, the foam may be about 1 inches thick; however, other suitable thicknesses and sound deadening materials may be used.

The sound deadening material 86 may be attached to the baffle plates 85 by any suitable method. In one example, the material may be adhesively bonded to the baffle plates. It will be appreciated that in alternative constructions, the baffle plates 85 may not have sound deadening material 86 attached and be bare.

To lessen the effects of resistance to air flow, the foam or other sound deadening material 86 on the top and bottom surface of each baffle plate 85 may include a thin metal foil facing 87. This acts to enclose any exposed pores or other surface irregularities in the foam or other material that may be used to decrease air flow resistance and further enhance the structural integrity of the composite baffle assembly. Advantageously, it has been found that applying sound deadening material 86 directly on the baffles 80 improves noise reduction from the flowing heated cooling air traveling through the air flow passages 81 in the shroud.

The baffle plates 85 may be mounted to the rear wall 61 of the noise suppression shroud 60 in one non-limiting implementation by any suitable means. In one example, fasteners 88 such as threaded fasteners or rivets may be used to attach the rear wall 61 via mounting angles 111 on the plates 85 that are oriented perpendicular to the top and bottom surfaces of the plates (not seen beneath sound deadening material or insulation on the rear of the access panel 40 in the figures). The fasteners 68 extend through the rear wall 61 and mounting angles on the inside surface of the rear wall. Other attachment means that may be used include soldering, welding, or adhesives. The shroud 60 and baffles 80 in the foregoing construction form a self-supported and self-contained structural unit which is attached to the access panel 60. In other possible implementations contemplated, the baffle plates 85 however may be mounted to the rear surface of the access panel 40 instead.

In one non-limiting implementation, the baffles 80 may further have a configuration which forms heated discharge cooling air flow passages 81 that are shaped to block any clear or straight line of sight between the heated air inlet 82 and the air outlet 83. Advantageously, this acts to reduce noise escaping from the generator housing 24 via the alternator heated cooling air discharge flow path. In addition, the configuration of the baffles 80 may simultaneously be selected to minimize creating undue resistance to air flow through the air flow passages 81 to maximize the air flow rate through the shroud 60.

To accomplish the foregoing objectives, in one possible design each of the baffles 80 may be shaped to form a straight entrance portion 89 oriented parallel to the horizontal centerline Ch of the shroud 60 and an adjoining angled exit portion 90 which is obliquely angled to the straight portion and the horizontal centerline of the shroud. In one arrangement, the entrance portion 89 may extend from the air inlet 82 at inlet plenum 93 to approximately the vertical centerline Cv of the shroud 60. The angled exit portion 90 begins at the bend line B of the baffle plate 85 where the straight entrance portion 89 terminates and extends upwards to the air outlet 83 at a suitable inclination angle A1. In other possible arrangements, the angled exit portion 90 of the baffle plates 85 may alternatively extend downwards at the inclination angle A1. The inclination angle A1 is selected to prevent a straight line of sight between the air inlet 82 and outlet 83. Non-limiting examples of angles A1 may be between 0 and 90 degrees, or further between 0 and 45 degrees. In one non-limiting example, angle A1 may be about 25 degrees. It is desirable that the angle A1 and vertical spacing of the flow baffles 80 are selected to avoid creating a straight line of sight between the entrance and exit of each air flow passage to maximize air flow noise reduction.

In bears noting that in some possible implementations, the straight entrance portions of the baffles 80 may be orientated at a small oblique angle to the horizontal centerline Ch of the shroud 60 instead of being parallel to centerline Ch such shown in the non-limiting illustrated embodiment. This allows for the possibility that the cooling air outlet 83 formed in the access panel 40 in some alternative arrangements, may not be at the same elevation (i.e. horizontally aligned) as the shroud cooling air inlet 83. In such an alternative oblique orientation of the baffles, however, the angled exit portions 90 of the baffles may nonetheless be oriented at an oblique inclination angle A1 with respect to the straight portions with the angle selected such that a straight line of sight is still avoided between the entrance and exit of each air flow passage to maximize air flow noise reduction.

From the foregoing description, it is evident that the baffles 80 may be substantially aligned with the horizontal direction of cooling air flow through the shroud 60 between the inlet 82 and outlet 83 with only slight variation. The angular variation provided by the angled exit portion 90 of the baffles deviates as minimally as possible from parallel to horizontal centerline Ch in order to prevent the straight line of sight. Unlike cross-flow baffle arrangements which are oriented perpendicular to the air flow direction which creates substantial turbulence and corresponding air flow noise, the baffles configuration provided advantageously creates minimal frictional resistance to flow and turbulence, while optimizing noise reductions.

It bears noting that in the illustrated arrangement, the baffles 80 are oriented perpendicular to both the direction in which air flow enters the shroud 60 through the cooling air inlet 82, and the direction in which air flow exits the shroud through air outlet 83 in the front access panel 40 of the generator housing 24. Air flow therefore enters and exits the shroud 60 in a front and rear directions, and transverses the length of the shroud in a lateral side to side direction at 90 degree angles to the inlet and outlet air flow directions. Advantageously, this flow path with change in direction further acts to suppress the noise generated by the flowing cooling air. This is achieved in part by locating the air inlet 82 at a first end of the shroud 60 adjacent one of the sidewalls 62 and locating the air outlet 83 at an opposing end of the shroud adjacent the remaining sidewall 62.

Additional sound deadening materials such as for example without limitation foam or another material may be added to the noise suppression shroud 60 or front access panel 40 to further improve air flow noise reduction. In some implementations, foam block 100 may be added inside cavity 67 of the shroud to the top wall 63 and each sidewalls 62. The foam may be ¼ to 2 inches thick in some examples. Foam may further be added to all or some portions of the rear surface 43 of the access panel 40 around the shroud 60.

To form a substantially air tight joint between the shroud cooling air inlet 82 and air discharge opening 33 of the alternator enclosure 32, an annular seal 110 may be attached on the rear wall 61 of the shroud 60 around the air inlet. This helps ensure that a majority of the heated cooling air discharged from the alternator enclosure enters the air inlet 82 and inlet plenum 93 of the shroud instead of escaping into the interior of the generator housing 24. The term "substantially" recognizes that in practice there may be some relatively minor or negligible leakage at the joint into the generator housing as a hermetic seal is unnecessary. In other possible implementations, the seal 110 may instead be disposed on the alternator enclosure around the air discharge opening 33 to the same effect. The shroud cooling air inlet 82 and discharge opening 33 of the alternator enclosure 32 may have the same size and complementary configuration to help form a leak resistant joint there-between. In one implementation, the air inlet 82 and discharge opening 33 may be in the form of an elongated rectilinear slot as illustrated. Other complementary-configured polygonal and non-polygonal shapes and sized may be used, however, including without limitation square, circular/rounded, oblong, L-shaped, etc. The shape of the air inlet and discharge opening are thus not limiting. The air outlet 83 on the access panel 40 may also have a similar shape and size to the air inlet and discharge opening, but is not necessary.

In use, when the access panel 40 is attached to the front of the generator housing 24, the seal is compressed against the alternator enclosure 32 and expands laterally outwards to form the air tight seal. Accordingly, in some implementations the shroud may be fluidly isolated from the internal chamber 31 of the generator housing 30. In addition, wherein the alternator enclosure may further be fluidly isolated from the internal chamber of the generator housing.

The annular seal 110 may be of any suitable type, configuration, and material for forming an air seal. In one implementation, seal 110 is a compressible seal formed of a resilient elastomeric material such as rubber or vinyl with a memory to rebound into a non-compressed configuration when the access panel 40 is removed from the generator housing 24.

The cooling air flow path through the generator housing 24 will now be briefly described. Ambient cooling air is first drawn into the generator housing 24 by the alternator cooling fan 25 through the housing air intake opening 26. The air becomes heated as it is directed across the alternator 23 by the fan. The now heated cooling air flows to and is discharged from the alternator enclosure through the air discharge opening 33 fluidly coupled to the cooling air inlet 82 on the noise suppression shroud 60. The heated air flows into the inlet 82 in a direction perpendicular to the length of the baffles 80 and front wall 41 of the access panel 40. The air fills the inlet plenum 93 of the shroud and air enters the air flow passages 81 between the flow baffles 80. The air flows in a general horizontal direction through the passages 81 from the entrance to the exit of each passage. The air thus flows between the baffles in a direction which is parallel to the front wall 41 of the panel 40 and perpendicular to the direction in which flow is first introduced into the shroud 60 through the air inlet 82 from the alternator enclosure 33. After leaving the air flow passages 81 and baffle array, the air then collects in the outlet plenum 94 in the shroud. Outlet plenum 94 is positioned adjacent to the cooling air outlet 83 in the access panel 40. The heated cooling air is discharged through the air outlet 83 into the ambient environment surrounding the generator housing 24. The air leaves the air outlet 83 in a direction perpendicular to the length of the baffles 80 and front wall 41 of the panel 40. In some implementations, the discharge air may instead be ducted from the generator housing to a point remote from and/or external to the environment in which the generator housing is located.

In some implementations, the shroud could be attached to the exterior front surface of the access panel 40 in lieu of the rear surface using the same arrangement methodology described herein. In yet other possible implementations, the shroud may be an integral portion of the access panel in lieu of a separate unit attached to the front or rear of the access panel. In such an arrangement, the flow baffles 80 may be sandwiched between the vertical front wall 41 of the panel 40 and a horizontal spaced apart rear wall that defines the opposing rear surface 43 of panel. The noise suppression shroud 60 may therefore be considered to be coextensive in length and height with the access panel 40. It bears noting that a similar shroud and baffle arrangement to that described above for discharging heated alternator cooling air can also be applied to the alternator enclosure air intake 26 to suppress noise which might escape from the ambient air intake.

Various modifications and variations of the noise suppression system are possible. The sound deadening material 86 (e.g. foam, fiberglass, mineral wool, etc.) could be on one or both of the top and bottom surfaces of the baffles 80. Additional sound deadening material could be included on the vertical perpendicular rear wall 61 of the shroud 60 and/or rear surface 43 of access panel 40 between the baffles. The sound deadening material could be of varying thicknesses such as for example without limitation on the tops and bottoms of the baffles which may be different thicknesses, along the length of the baffles in which the thickness may vary, and/or from the front to back of each baffle which may vary in thickness. The sound deadening material 86 could also be varied in density to tune the material for the specific frequency trying to be suppressed. All of the sound deadening material on the baffles could be the same density or the density may vary along the length of the baffles or be different on some baffles compared to other baffles to achieve the desired noise suppression tuning. The baffles and sound-absorbing material could be integrally constructed from a single material as a unitary monolithic structure (e.g. molded fiberglass, etc.)

The physical construction, configuration, and arrangement of the baffles 80 may also have numerous variations. There could be multiple angles on each of the baffles if length and pressure drop allow. The spacing of the baffles could be modified/optimized for the intended application to tune the baffles for the specific frequency trying to be suppressed. The angle A1 of the angled exit portions 90 of the baffles 80 could be oriented upwards or downwards to project the air upwards or downwards respectively into the air outlet 83 in the access panel 40. Alternatively, the angled portions 90 of the baffles may instead be located proximate to the heated air inlet 82 of the shroud and the straight portions 89 may be located proximate to the access panel air outlet 83.

It bears noting that the noise suppression system disclosed herein can be used in various industries and applications including without limitation marine, industrial, residential, and commercial.

While the foregoing description and drawings represent some example systems, components, and methods/processes, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed examples are therefore to be considered in all respects as illustrative and not restrictive, the scope of the invention being defined by the appended claims and equivalents thereof, and not limited to the foregoing description or examples. Rather, the appended claims should be construed broadly, to include other variants and arrangements of the invention, which may be made by those skilled in the art without departing from the scope and range of equivalents of the invention.

What is claimed is:

1. A generator system having noise suppression, the generator system comprising:
   a generator housing;
   an electric generator disposed inside the generator housing, the generator including an internal combustion engine and an alternator coupled to the engine;
   an array of parallel flow baffles defining a plurality of parallel air flow passages between ends of the baffles, each of the air flow passages including an entrance for receiving heated air from the alternator and an exit for discharging the heated air;
   wherein the flow baffles are configured so that there is no straight line of sight between the entrance and the exit of each of the air flow passages.

2. The generator system according to claim 1, wherein the baffles include a layer of sound deadening material attached to top and bottom surfaces of each baffle.

3. The generator system according to claim 2, further comprising foil facing applied to the layers of sound deadening materials adjacent to the air flow passages.

4. The generator system according to claim 1, wherein the flow baffles are disposed in an openable access panel attached to the generator housing and openable therewith.

5. The generator system according to claim 4, wherein the flow baffles are mounted inside a cavity of a shroud attached to the access panel.

6. The generator system according to claim 5, wherein the alternator is located inside an enclosure within the generator housing, the shroud disposed between the enclosure and access panel, and fluidly coupled directly to an air discharge opening of the enclosure.

7. The generator system according to claim 6, wherein the shroud includes an air inlet having a complementary configuration to the air discharge opening of the enclosure, the air inlet fluidly sealed to the air discharge opening by a compressible annular seal surrounding the air inlet.

8. The generator system according to claim 7, wherein the annular seal is formed of a resilient elastomeric material.

9. The generator system according to claim 7, wherein the generator housing further includes an air outlet disposed at an opposite end of the shroud from the air inlet.

10. The generator system according to claim 9, wherein the air inlet is located on a rear wall of the shroud and the air outlet is located on a front wall of the generator housing.

11. The generator system according to claim 1, wherein the flow baffles are horizontally elongated and extend horizontally between an air outlet in the generator housing through which heated cooling air is discharged from the flow baffles to atmosphere and an air inlet which receives heated cooling air from the alternator.

12. The generator system according to claim 5, wherein each flow baffle includes a straight entrance portion oriented parallel to a horizontal centerline of the shroud and an adjoining angled exit portion which is obliquely angled to straight portion and the horizontal centerline of the shroud.

13. A generator system having noise suppression, the generator system comprising:
- a generator housing;
- an electric generator disposed inside the generator housing, the generator including an internal combustion engine and an alternator coupled to the engine;
- an array of parallel flow baffles defining a plurality of parallel air flow passages between ends of the baffles, each of the air flow passages including an entrance for receiving heated air from the alternator and an exit for discharging the heated air;
- wherein the flow baffles are configured so that there is no straight line of sight between the entrance and the exit of each of the air flow passages;
- wherein the flow baffles are arranged in a common vertical plane.

14. A generator system having noise suppression, the generator system comprising:
- a generator housing;
- an electric generator disposed inside the generator housing, the generator including an internal combustion engine and an alternator coupled to the engine;
- an array of parallel flow baffles defining a plurality of parallel air flow passages between ends of the baffles, each of the air flow passages including an entrance for receiving heated air from the alternator and an exit for discharging the heated air;
- wherein the flow baffles are configured so that there is no straight line of sight between the entrance and the exit of each of the air flow passages; and
- wherein the flow baffles are mounted inside a cavity of a shroud removably attached to the access panel, the flow baffles and shroud being movable with the access panel.

* * * * *